(12) United States Patent
Hoang

(10) Patent No.: US 6,902,198 B2
(45) Date of Patent: Jun. 7, 2005

(54) SCRATCH TAPE

(76) Inventor: Ho Yeon Hoang, 10/2,#22, Anam-Dong 3-Ga, Sungbuk-Ku, Seoul (KR)

(*) Notice: Subject to any disclaimer, the term of this patent is extended or adjusted under 35 U.S.C. 154(b) by 259 days.

(21) Appl. No.: 09/862,272

(22) Filed: May 22, 2001

(65) Prior Publication Data

US 2002/0142685 A1 Oct. 3, 2002

(30) Foreign Application Priority Data

Mar. 15, 2001 (KR) .......................... 2001-13429

(51) Int. Cl.$^7$ ............................................. B42D 15/00
(52) U.S. Cl. ............................. 283/72; 283/81; 283/89; 283/114; 442/59; 442/76; 442/131; 442/133; 442/149; 428/40.1; 428/41.7; 428/542.6; 428/543
(58) Field of Search ........................... 442/59, 76, 131, 442/132, 133, 149; 428/40.1, 41.7, 41.8, 42.2, 42.3, 355 R, 542.6, 543, 915, 916, 355 RA; 283/72, 81, 101, 903, 901, 114, 89, 93, 100, 104

(56) References Cited

U.S. PATENT DOCUMENTS

| | | | |
|---|---|---|---|
| 5,193,854 A | * | 3/1993 | Borowski et al. .............. 283/87 |
| 5,591,527 A | * | 1/1997 | Lu ........................... 428/411.1 |
| 5,704,647 A | | 1/1998 | Desbiens |
| 6,454,895 B1 | * | 9/2002 | Weder ........................ 156/209 |

* cited by examiner

Primary Examiner—Arti R. Singh
(74) Attorney, Agent, or Firm—Galgano & Burke, LLP

(57) ABSTRACT

A scratch tape includes a base substrate, a UV coating layer formed on the upper surface of the base substrate, a light-proof layer 30 formed of the UV coating layer for shielding light, and a water-based coating layer 40 such that the enhanced lightproof property provides the security-required products with the reliable security, and is manufactured using the platen press printing such the whole manufacturing costs can be reduced.

7 Claims, 2 Drawing Sheets

SCRATCH TAPE

BACKGROUND OF THE INVENTION (a) Field of the Invention

The present invention relates to a scratch tape and a method for manufacturing the same, and in particular, to a scratch tape and its manufacturing method capable of improving lightproof property thereof.

(b) Description of the Related Art

Recently, issued are various cyber lottery tickets, pre-paid cards, phone cards, and gift certificates having secret numbers of winning numbers, and the numbers are secured using various techniques until the tickets/cards are sold.

One of the techniques is to apply a tape processed by a silk screen-printing thereon. The tape is manufactured by applying a fabric such as PET $50^{th}$ micro polyester on a light blue or white kraft paper, manufactured by the Fuji company, with an adhesive and then required areas of the tape is doped with silver ink using the silk screen process. However, this silkscreen process causes the ink to be thickly doped, resulting in wasting of the ink.

Furthermore, the silkscreen process has some drawbacks in that the security required area can be read without scratching off the silver ink-doped layer such that the security is not reliable. Also, the ink layer can be unintentionally scratched during a transport and storage since the doped surface is not even.

SUMMARY OF THE INVENTION

The present invention has been made in an effort to solve the above problems of the prior art.

It is an object of the present invention to provide a scratch tape capable of enhancing security reliability by forming a lightproof layer on the scratch tape using a platen press, and protecting the lightproof layer from being scratched during a transport and storage by forming a water-based coating layer on the lightproof layer.

It is another object of the present invention to provide a method for manufacturing an improved scratch tape capable of enhancing security reliability.

To achieve the above object, the scratch tape of the present invention comprises a base substrate, a UV coating layer formed on the upper surface of the base substrate, a lightproof layer 30 formed of the UV coating layer for shielding light, and a water-based coating layer.

BRIEF DESCRIPTION OF THE DRAWINGS

The accompanying drawings, which are incorporated in and constitute a part of the specification, illustrate an embodiment of the invention, and together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 1:
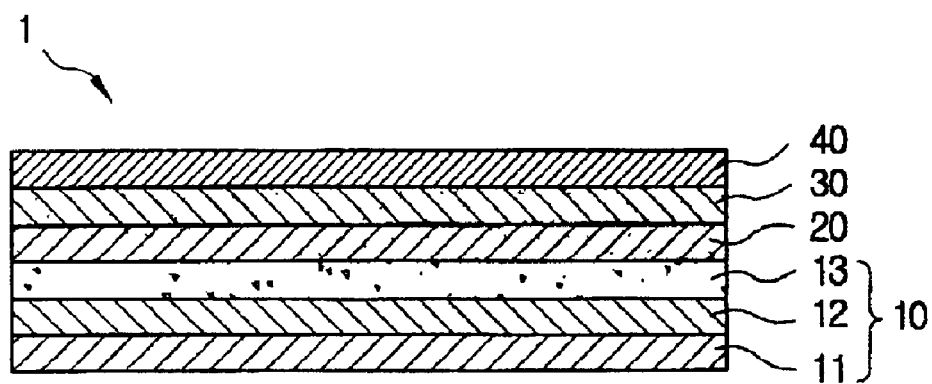
FIG. 1 is a cross-sectional view illustrating a layered structure of a scratch tape according to a preferred embodiment of the present invention.
Figure 2:
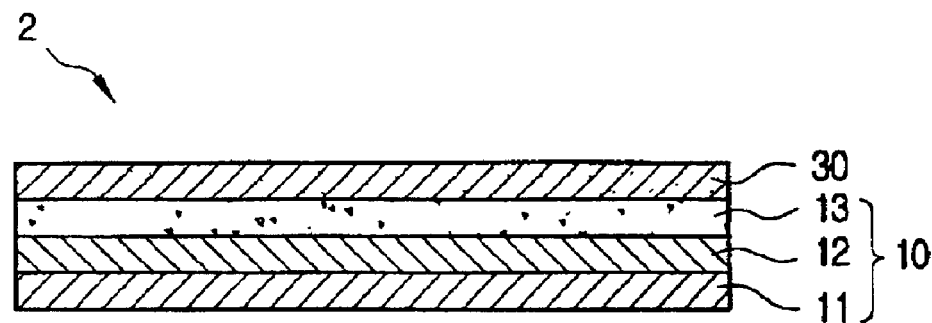
FIG. 2 is a cross-sectional view illustrating a layered structure of a prior art scratch tape.

FIG. 1 is a cross-sectional view illustrating a layered structure of a scratch tape according to a preferred embodiment of the present invention.

As shown in FIG. 1, a scratch tape sheet 1 according to a preferred embodiment of the present invention comprises a base substrate 10, an ultraviolet (UV) coating layer 20, a lightproof layer 30, and a water-based coating layer 40 deposited in sequential order.

The base substrate 10 comprises a carrier web 11, an adhesive layer 12, and a fabric 13 orderly deposited such that the fabric 13 is applied to an upper surface of the carrier web 11 with the adhesive layer 12.

In this embodiment of the present invention, the carrier web 11 is a light blue or white draft paper of the Fuji company, and the adhesive layer 12 is a conventional polyurethane and synthetic rubber adhesive as it is or attenuated such that the fabric 13 can be easily peeled off from the carrier web 11, when needed. As the fabric 13, a polyester fiber such as PET $50^{th}$ micro polyester is used for enhancing a tear resistance of the scratch tape.

The adhesive 12 remains only on the fabric 13 when the fabric 13 is peeled off from the carrier web 11 since the adhesive 12 is stuck on a lower surface of the fabric 13 with stronger adhesion strength than the adhesion strength to an upper surface of the carrier web 11.

After the base substrate 10 is manufactured as above, the UV coating layer 20 is formed in such a way of doping an UV coating and stabilizing the UV coating by exposing to the light. The UV coating can be one of the conventional UV coatings.

The UV coating layer 20 is formed in order to border the lightproof layer 30 and the base substrate 10 such that the lightproof layer 30 can be easily scratched and in order to enhance a printability of the ink when forming the lightproof layer 30.

The lightproof layer 30 is formed in such a way that a silver, white, and gray inks are printed several times in predetermined order using a platen press.

The printing inks are viscous liquids containing inorganic pigments so as to preventing the light from penetrating the lightproof layer 30 after the ink printed.

The silver, black and white inks for forming the lightproof layer 30 are respective K2311049, K2106235, and K2401096 (product number) manufactured by the Korean Special Ink co., and a ZELLER™ flexo platen press machine is used for a platen press process.

In the platen press, a flat surface bearing a paper is pressed against the flat, inked printing plate.

In the present invention, the platen press printing is performed in such a way of printing the silver, silver, white, white, silver, silver, black, and silver inks in sequential order for enhancing the lightproof property of the scratch tape. After each printing stage, the printed ink is dried during a predetermined period.

The lightproof layer 30 is formed on the UV coating layer 20 in this manner such that the scratch tape can obtain the security reliability because the repeatedly printed lightproof layer 30 shields the light, resulting in making security-required content such as serial number, symbol, and character illegible without scratching the lightproof layer 30.

Finally, the water-based coating layer 40 is formed on the lightproof layer 30 with a conventional water-based paint. This water-based coating layer 40 prevents the lightproof tape from being unintentionally scratched during the transportation and storage.

Figure 3:
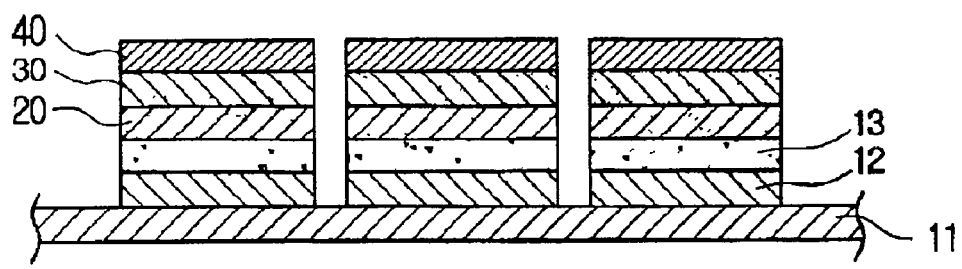
FIG. 3 is a cross-sectional view showing the scratch tape of FIG. 1 cut for applying to a security-required product.
Figure 4:
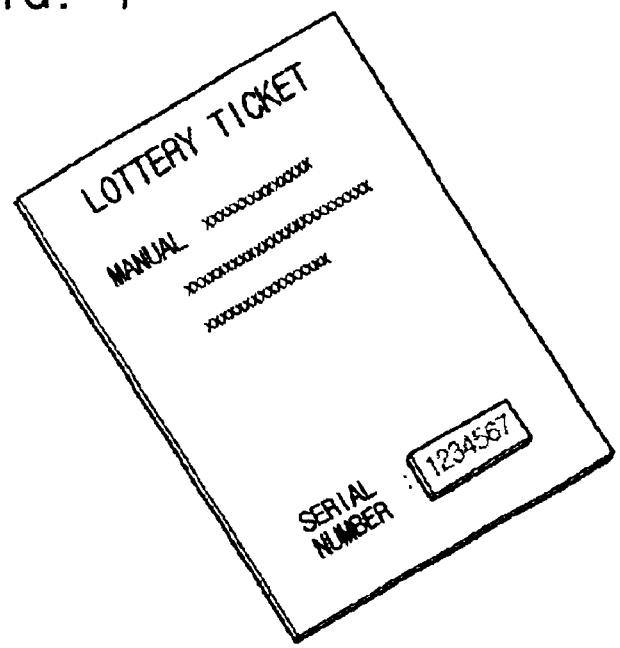
FIG. 4 is an exemplary view showing the scratch tape of FIG. 1 applied to the security-required product.

Referring to FIG. 3, the scratch tape sheet 1 manufactured in this manner is slit to the fabric 13 in a predetermined size corresponding to the security-required area of the product such as lottery ticket such that each scratch tape can be peeled off from the carrier web 11 and applied on the surface of the product. Also, characters or symbols for guiding scratch can be printed on the surface of the water-based coating layer 40.

Since the scratch tape 1 of the present invention is manufactured using the platen press, whole manufacturing cost of the scratch tape can be reduced and also the lightproof property is superior to the conventional scratch tape manufactured using silk printing.

The process for manufacturing the scratch tape of the present invention will now be described in more detail hereinafter.

Firstly, a base substrate 10 is formed in a predetermined size by applying a PET 50$^{th}$ micro polyester fabric 13 of a thickness of 50 μm on a light blue kraft paper with polyurethane adhesive. After the base substrate 10 is formed, a UV coating liquid, manufactured by the Korean Special Ink co., is doped over the surface of the fabric 13 and dried by exposing the UV coated surface to the light such that an UV coating layer 20 is formed on the base substrate 10.

Next, a lightproof layer 30 is formed on the UV coating layer in such a way of repeatedly doping and drying flexo inks in a sequential order of silver, silver, white, white, silver, silver, black, and silver inks, manufactured by the Korean Special Ink co., using the ZELLER™ platen press-flexo printer.

After the lightproof layer 30 is formed, a water-based coating layer 40 is formed over the lightproof layer 30 by doping and drying a water based coating liquid (Japanese water-based F-6, lot No. 12104022) using the conventional water-based coating process, and finally, characters or symbols are printed on the water-based coating layer in need. These characters or symbols can be read clearly because the silver ink is finally printed while forming the lightproof layer so as to be a background color of the characters or symbols.

The scratch tape sheet 1 manufactured in this manner is reeled in a roller and slit to the fabric 13 in a predetermined size for covering the security-required area of the product such as cyber lottery ticket, pre-paid card, phone card on which the scratch tape to be applied using an automatic cutter such that each scratch tape is peel off from the carrier web 11.

To estimate the improvement of the scratch tape according to the preferred embodiment of the present invention, a lightproof property test is performed.

In this lightproof property test, the cyber lottery ticket, pre-paid card, and phone card manufactured using the scratch tape of the present invention and comparative lottery tickets, pre-paid cards, and phone cards of three different brands in the markets were tested.

This lightproof property test was performed in such a way of measuring illegibility of the characters, numbers, or symbols covered by the scratch tapes for security when the areas covered by scratch tapes were exposed to the light. The lightproof property test result is shown in the following table 1.

TABLE 1

|  | Cyber lottery ticket | Pre-paid ticket | Phone Card |
|---|---|---|---|
| Present invention | ◯ | ◯ | ◯ |
| Comparative sample 1 | ◯ | Δ | X |
| Comparative sample 2 | Δ | ◯ | Δ |
| Comparative sample 3 | Δ | Δ | Δ |

◯: completely illegible
Δ: shown as a silhouette
X: legible clearly or faintly

The table 1 shows that the scratch tape of the present invention provides the security-required products with the superior lightproof property to the scratch tapes manufactured by the other printing methods.

As described above, since the scratch tape of the present invention is manufactured using the platen press printing, the whole manufacturing costs can be reduced. Also, the scratch tape has the lightproof layer 30 such that the enhanced lightproof property provides the security-required products with the reliable security.

Furthermore, the water-based coating layer 40 formed on the lightproof layer 30 prevents the lightproof layer 30 from being unintentionally scratched during the transportation and storage.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A scratch tape comprising:
   a base substrate;
   a UV coating layer formed on the upper surface of the substrate;
   a lightproof layer formed on the UV coating layer for shielding light, wherein the lightproof layer is formed by printing silver, white and black inks on the UV coating layer; and wherein the inks are printed several times in sequential order of silver, silver, white, white, silver, silver, black and silver colors; and
   a water based coating layer for preventing the scratch tape from being unintentionally scratched during transportation and storage.

2. A scratch tape of claim 1, wherein the lightproof layer is formed using platen press printing.

3. A product applied by at least one scratch tape of claim 1 thereon for securing product security.

4. A product applied by at least one scratch tape of claim 2 thereon for product security.

5. A product of claim 3 wherein the product is a cyber lottery ticket, pre-paid card, or phone card.

6. A product of claim 4 wherein the product is a cyber lottery ticket, pre-paid card, or phone card.

7. A scratch tape of claim 1 wherein the base substrate further comprises: a carrier web; a fabric layer formed over the carrier web; and an adhesive layer interposed between the carrier web and the fabric layer for combining to each other.

* * * * *